(12) United States Patent
Tsunesada et al.

(10) Patent No.: US 7,643,131 B2
(45) Date of Patent: Jan. 5, 2010

(54) SPATIAL INFORMATION DETECTION DEVICE AND SPATIAL INFORMATION DETECTION SYSTEM USING THE SAME

(75) Inventors: Fumi Tsunesada, Kadoma (JP); Yusuke Hashimoto, Kadoma (JP); Fumikazu Kurihara, Kadoma (JP); Yuji Takada, Kadoma (JP); Atsushi Hironaka, Kadoma (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 258 days.

(21) Appl. No.: 11/919,746

(22) PCT Filed: May 1, 2006

(86) PCT No.: PCT/JP2006/309071

§ 371 (c)(1),
(2), (4) Date: Nov. 1, 2007

(87) PCT Pub. No.: WO2006/118286

PCT Pub. Date: Nov. 9, 2006

(65) Prior Publication Data

US 2009/0079955 A1   Mar. 26, 2009

(30) Foreign Application Priority Data

May 2, 2005   (JP)   ............................... 2005-134393

(51) Int. Cl.
*G01C 3/08* (2006.01)
(52) U.S. Cl. ..................................... 356/4.07; 356/4.01
(58) Field of Classification Search ................ 356/4.01, 356/4.07, 5.01; 250/203.1, 203.06
See application file for complete search history.

(56) References Cited

U.S. PATENT DOCUMENTS

| 4,697,904 | A | | 10/1987 | Takahashi et al. |
| 5,966,678 | A | * | 10/1999 | Lam ............................. 702/97 |
| 6,341,015 | B2 | * | 1/2002 | Shirley ........................ 356/517 |

(Continued)

FOREIGN PATENT DOCUMENTS

JP   61-128216   6/1986

(Continued)

OTHER PUBLICATIONS

International Search Report for Application No. JP/2006/309071, mailed Jun. 6, 2006.

*Primary Examiner*—Isam Alsomiri
(74) *Attorney, Agent, or Firm*—Edwards Angell Palmer & Dodge LLP (57) ABSTRACT

A spatial information detection device is provided, which is capable of, even under the condition that an environmental light having intensity fluctuations exists in a target space, projecting a light intensity-modulated with a predetermined modulation signal from a light emitting source into the target space, receiving light from the target space with a photodetector, and detecting spatial information of the target space from a change between the light projected from the light emitting source and the light received by the photodetector. This device has a smoothing unit configured to integrate, over a predetermined integration period, a fluctuation component in a prescribed phase zone of the modulation signal with respect to an electric charge amount generated by receiving the environmental light in the electric charge amount generated at the photodetector by receiving the light from the target space, thereby smoothing the fluctuation component.

17 Claims, 3 Drawing Sheets

U.S. PATENT DOCUMENTS 7,138,646 B2 * 11/2006 Hashimoto et al. ..... 250/559.38
2005/0145773 A1 7/2005 Hashimoto et al.

FOREIGN PATENT DOCUMENTS

| JP | 4-307340 | 10/1992 |
| JP | 6-273662 | 9/1994 |
| JP | 9-152332 | 6/1997 |
| JP | 10-041802 | 2/1998 |
| JP | 2000-145294 | 5/2000 |
| JP | 2004-032682 | 1/2004 |
| WO | WO-96/15626 | 5/1996 |
| WO | WO-2004/008175 | 1/2004 |

* cited by examiner

SPATIAL INFORMATION DETECTION DEVICE AND SPATIAL INFORMATION DETECTION SYSTEM USING THE SAME

TECHNICAL FIELD

The present invention relates to a spatial information detection device for receiving a light from a target space, into which an intensity-modulated light is being irradiated, and detecting information about the target space.

BACKGROUND ART

In the past, the technique of detecting spatial information such as a distance to an object existing in a target space by receiving light from the target space, into which an intensity modulated light is being projected, and determining a phase difference in the modulation component between the projected light and the received light has been known. For example, as introduced in PCT International Publications Nos. WO96/15626 and WO2004/008175A, a spatial information detection device based on this technique is basically formed with a light emitting source for projecting a light intensity-modulated with a predetermined modulation period into the target space, a photodetector having a photoelectric converting portion configured to receive light from the target space, and generate electric charges corresponding to a received light amount, and an evaluation portion configured to detect the spatial information of the target space from a change between the light projected from the light emitting source and the light received by the photodetector.

By the way, since this kind of detection device projects the intensity-modulated light into the target space, there is an inconvenience when detecting the spatial information from a common target space by a plurality of detection devices. That is, when plural lights are simultaneously projected into the target space from the detection devices, it becomes difficult to distinguish the light projected from the light emitting source of one of the detection devices into the target space from the light projected from another one of the detection devices into the target space. In other words, each of the detection devices cannot extract only the light projected into the target space by its own light emitting source from the plural lights projected into the target space. As a result, it leads to a deterioration in detection accuracy of the spatial information.

SUMMARY OF THE INVENTION

In consideration of the above mentioned problem, a primary concern of the present invention is to provide a spatial information detection device, which is capable of, when detecting the spatial information from a common target space by a plurality of spatial information detection devices, or even when an environmental light having intensity fluctuations exists in the target space, accurately detecting the desired spatial information from the target space.

That is, the spatial information detection device of the present invention comprises:

a light emitting source configured to project a light intensity-modulated with a modulation signal having a predetermined modulation frequency into a target space;

a photodetector having a photosensitive portion configured to receive light from the target space, and generate electric charges corresponding to a received light amount;

an evaluation portion configured to detect spatial information of the target space by use of electric charges generated during a period synchronized with a prescribed phase zone of the modulation signal in the electric charges generated by the photosensitive portion; and smoothing means configured to, when an environmental light having intensity fluctuations exists in the target space, integrate, over a predetermined integration period, a fluctuation component in the prescribed phase zone of the modulation signal with respect amounts of electric charges generated at the photosensitive portion by receiving the environmental light, thereby smoothing the fluctuation component.

According to the spatial information diction device described above, since the fluctuation component of the environmental light in the prescribed phase zone of the modulation signal of the intensity-modulated light provided from the light emitting source is integrated and smoothed, it is possible to readily distinguish the fluctuation component in the phase zone of the intensity-modulated light received from the target space from the fluctuation component in the aforementioned phase zone of the environmental light.

As a preferred embodiment of the spatial information detection device described above, the smoothing means is configured to integrate, over the predetermined integration period, the fluctuation component of the environmental light with respect to each of two prescribed phase zones of the modulation signal of the light emitting source, thereby smoothing the fluctuation component. The evaluation portion is configured to determine a difference in amount of electric charge between the two prescribed phase zones with respect to the amounts of electric charges generated by receiving the light from the target space with the photodetector, so that the fluctuation components of the environmental light in the two prescribed phase zones are cancelled each other, and detect the spatial information by use of the difference. In this case, by integrating the fluctuation component of the environmental light over a sufficient integration period with respect to each of the two phase zones, thereby smoothing the fluctuation component, a difference between these fluctuation components becomes substantially zero or negligibly small. Therefore, determining the difference in the amount of electric charge between the two phase zones with respect to the amounts of electric charges generated by receiving the light from the target space with the photodetector is equivalent to determining the difference in the amount of electric charge between the two phase periods with respect to the amounts of electric charges generated by receiving the intensity-modulated light from the target space with the photodetector. Hence, according to the present invention, it is possible to reduce or eliminate the influence of the environmental light existing in the target space, and accurately detect the desired special information according to the received light amount of the intensity-modulated light from the target space.

When the environmental light has a known frequency different from the modulation frequency of the light emitting source, it is preferred that the smoothing means is configured to integrate the fluctuation component over the integration period, which is determined according to a frequency difference between the modulation frequency of the light emitting source and the frequency of the environmental light. For example, even when an environmental light component having a known modulation frequency exists in the target space, such as a case where two spatial information detection devices are used such that the target space for one of them is at least partially overlapped with the target space for the other one, the fluctuation component of the environmental light can be eliminated according to the above-described principle by using a different modulation frequency of the modulation signal. Here, when the environmental light has a known single frequency, it is preferred that the integration period is equal to an integral multiple of a period of a beat component determined by the frequency difference between the modulation frequency of the light emitting source and the frequency of the environmental light. On the other hand, when the environmental light has a plurality of known frequencies, it is preferred that the integration period is equal to an integral multiple of a period of each of beat components, which is determined by the frequency difference between the modulation frequency of the light emitting source and each of the frequencies of the environmental light. In this case, even when three or more of the spatial information detection devices using known modulation frequencies are simultaneously operated, it becomes possible to eliminate the environmental light component.

The above-described spatial information detection device preferably has a frequency selecting portion configured to select the modulation frequency of the light emitting source from a plurality of previously set modulation frequencies. In this case, when the spatial information is detected by plural spatial information detection devices, which are used such that the target space for one of them is at least partially overlapped with the target space for another one of them, a different modulation frequency can be set in each of the spatial information detection devices. Therefore, even when the plural spatial information detection devices are simultaneously operated, it is possible to effectively eliminate the environmental light component.

In addition, the spatial information detection device preferably has a frequency switching portion configured to change the modulation frequency of the light emitting source with time. In this case, as in the case of forming the frequency selecting portion described above, a different modulation frequency can be set in each of the plural spatial information detection devices. Therefore, even when the plural spatial information detection devices are simultaneously operated, it is possible to effectively eliminate the environmental light component. In addition, since it is not needed to individually set the modulation frequency in each of the special information detection devices, an improvement in usability is expected. It is also preferred that the frequency switching portion is configured to change the modulation signal on an irregular base. In this case, it is possible to lower the probability that the modulation frequencies used in the plural special information detection devices accidentally become equal to each other, and further reduce the influence of the environmental light component, as compared with the case of changing the modulation frequency on a regular basis.

In addition, the spatial information detection device preferably has an interference decision portion configured to make a decision as to whether the environmental light has an influence on detection accuracy of the spatial information by use of the fluctuation component of the environmental light smoothed by the smoothing means. In this case, it is more preferred that the spatial information detection device has a frequency switching portion configured to, when the interference decision portion makes the decision that the environmental light has the influence on detection accuracy of the spatial information, change the modulation frequency of the light emitting source until the influence of the environmental light falls within a permissible range.

As a preferred embodiment of the interference decision portion, for example, it is preferred that the spatial information detection device further comprises a light emission controller configured to control the light emitting source to have a light projection period where the light is projected from the light emitting source into the target space and a rest period where the light is not projected from the light emitting source into the target space. In this case, the smoothing means is configured to integrate, over the predetermined integration period, fluctuation components in two prescribed phase zones of the modulation signal with respect to electric charges generated at the photosensitive portion by receiving the environmental light in the rest period, thereby smoothing the fluctuation components. In addition, the interference decision portion is configured to compare a difference between the fluctuation components smoothed with respect to the electric charges generated by receiving the environmental light in the rest period with a threshold value, and make a decision that the fluctuation components of the environmental light exceed a predetermined permissible range when the difference is larger than the threshold value. According to this configuration, since light projection can be intermittently performed by alternately setting the light projection period where the light is projected from the light emitting source into the target space and the rest period where the light is not projected from the light emitting source into the target space, the influence of the fluctuation component of the environmental light can be detected and evaluated by use of the environmental light component received during the rest period where the intensity-modulated light is not projected. In addition, it is possible to readily determine whether another spatial information detection device has the common target space.

In addition, it is preferred that the spatial information detection device further comprises a frequency switching portion configured to, when the interference decision portion makes the decision that the fluctuation components of the environmental light exceed the permissible range, change the modulation frequency of the light emitting source until the difference becomes smaller than the threshold value. According to this configuration, since it is not needed to individually set the modulation frequency in the case of using the plural spatial information detection devices, an improvement in usability is expected. In addition, the modulation frequencies are automatically set so as to avoid interference therebetween. Therefore, it becomes possible to accurately detect the spatial information, while minimizing the influence of the environmental light component.

In addition, when the environmental light has a known frequency different from the modulation frequency of the light emitting source, it is preferred that the smoothing means is configured to determine, over the integration period determined by a frequency difference between the modulation frequency of the light emitting source and the frequency of the environmental light, integrate values of fluctuation components in two prescribed phase zones of the modulation signal with respect to amounts of electric charges generated at the photodetector by receiving the light in the rest period, and the evaluation portion is configured to, when a difference between the integrated values is not greater than a threshold value, detect the spatial information by using the amounts of electric charges obtained over the integration period in the light projection period. According to this configuration, the influence of the fluctuation component of the environmental light is decided by use of the difference between the integrated values determined with an appropriate integration time in the rest period. In addition, according to the decision result, whether the spatial information should be detected is determined by using the amounts of electric charges obtained with the integration time in the light projection period. Therefore, even when using plural spatial information detection devices having the common target space, it is possible to perform the detection of the spatial information with high reliability.

In addition, it is preferred that the evaluation portion has a conversion table where an intermediate value corresponding to a phase difference between the light projected from the light emitting source into the target space and the light received by the photodetector is associated with the difference, and a distance to an object existing in the target space is determined by compensating the intermediate value obtained form the conversion table with a compensation value determined according to the modulation frequency of the light projected from the light emission source into the target space. According to this configuration, even when using a different modulation frequency, the same conversion table can be utilized. By the commonality of data, it is expected that the production of the spatial information detection device becomes easy. In addition, when using a theoretical equation, an error may occurs due to variations in device characteristics. On the other hand, when using the conversion table, it is possible to set data, in which the error resulting from the device characteristics is interfolded. As a result, a distance to the object can be detected with stable accuracy.

A further concern of the present invention is to provide a spatial information detection system, which is capable of, when detecting the spatial information by a plurality of spatial information detection devices, which are used such that the target space for one of them is at least partially overlapped with the target space for another one of them, accurately detecting the spatial information by each of the detection devices according to the same principle as the above.

That is, this spatial information detection system comprises:

a first detection device comprising a light emitting source configured to project a light intensity-modulated with a first modulation signal into a target space; a photodetector having a photosensitive portion configured to receive light from the target space and generate electric charges corresponding to a received light amount; and an evaluation portion configured to detect spatial information of the target space by use of electric charges generated during a period synchronized with a prescribed phase zone of the first modulation signal in the electric charges generated by the photosensitive portion; and a second detection device comprising a light emitting source configured to project a light intensity-modulated with a second modulation signal different from the first modulation signal into the target space; a photodetector having a photosensitive portion configured to receive light from the target space and generate electric charges corresponding to a received light amount; and an evaluation portion configured to detect spatial information of the target space by use of electric charges generated during a period synchronized with a prescribed phase zone of the second modulation signal in the electric charges generated by the photosensitive portion;

wherein the first detection device comprises smoothing means configured to, when the light intensity-modulated with the first modulation signal and the light intensity-modulated with the second modulation signal simultaneously exist in the target space, integrate, over a predetermined integration period, a fluctuation component in the prescribed phase zone of the first modulation signal with respect to amounts of electric charges generated by receiving the light intensity-modulated with the second modulation signal in amounts of electric charges generated at the photosensitive portion of the first detection device by receiving the light from the target space, thereby smoothing the fluctuation component.

In this case, since the fluctuation component of the intensity-modulated light provided from the second detection device in the prescribed phase zone of the first modulation signal of the intensity-modulated light provided from the first detection device is integrated over the predetermined integration time, thereby smoothing this fluctuation component, it is possible to easily distinguish the fluctuation component in the prescribed phase zone of the intensity-modulated light of the first detection device received from the target space from the fluctuation component in the prescribed phase zone of the intensity-modulated light of the second detection device. In particular, it is preferred that the smoothing means is configured to integrate, over the predetermined integration period, the fluctuation component of the intensity-modulated light of the second detection device with respect to each of two prescribed phase zones of the first modulation signal of the first detection device, thereby smoothing the fluctuation component, and the evaluation portion is configured to determine a difference in the amount of electric charge between the two phase zones with respect to the amounts of electric charges generated by receiving the light from the target space with the photodetector of the first detection device, so that the fluctuation components in the aforementioned two phase zones of the intensity-modulated light of the second detection device are cancelled each other, and detect the spatial information by use of the difference. In this case, from the same reason described above, it is possible to reduce or eliminate the influence of the intensity-modulated light of the second detection device, and accurately detect the desired special information according to the received light amounts in the prescribed phase zones of the intensity modulated light of the first detection device from the target space. Therefore, even when detecting the spatial information by a plurality of spatial information detection devices of the same type, which are used such that the target space for one of them is at least partially overlapped with the target space for another one of them, it becomes possible to accurately detect the desired spatial information according to the intensity-modulated light projected from one of the detection devices into the target space without the influence of the intensity-modulated lights projected from the other detection devices into the target space.

Further characteristics of the present invention and advantages brought thereby will be clearly understood from the best mode for carrying out the invention described below.

BEST MODE FOR CARRYING OUT THE INVENTION

In preferred embodiments explained below, a distance measuring device for measuring a distance to an object existing in a target space is exemplified as a spatial information detection device (hereinafter referred simply to as "detection device"). However, the spatial information is not limited to the distance in the present invention. For example, the spatial information also comprises information obtained by removing an environmental light component such as reflectance of the object existing in the target space or brightness information of the object. In addition, a brightness image, which is not influenced by ambient light intensity, can be generated by use of the brightness information. The distance measuring device explained below generates a distance image where each pixel is associated with a distance to each position in the target space by taking an image of the target space.

Basic Configuration of Detection Device

Figure 1:
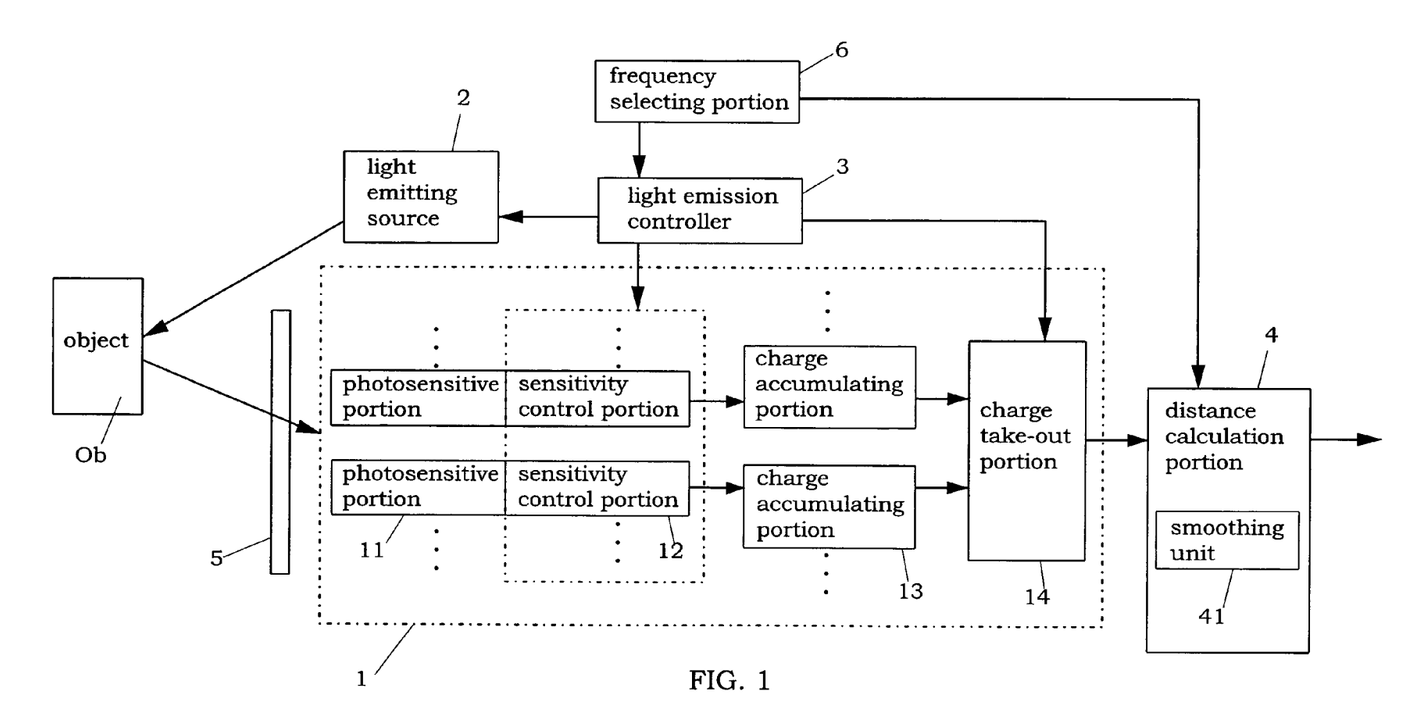
FIG. 1 is a schematic block diagram showing a spatial information detection device according to a first embodiment of the present invention.

As shown in FIG. 1, the distance measuring device of this embodiment is provided with a light emitting source 2 for projecting light into a target space, and a photodetector 1 for receiving light from the target space to provide an output corresponding to the received light amount. A distance to an object Ob existing in the target space is determined according to a time period (hereinafter referred to as "time of flight") required from the projection of the light from the light emitting source 2 into the target space to the incident of a reflected light from the object Ob on the photodetector 1. In this regard, since the time of flight is extremely short, a technique is used, which comprises the steps of projecting an intensity-modulated light from the light emitting source 2 into the target space, determining a phase difference between the projected light and the received light with respect to the modulated component of the light intensity, and converting this phase difference into the time of flight. The intensity-modulated light is obtained by giving a modulation signal with a predetermined modulation frequency from a light emission controller 3 to the light emitting source 2. In brief, the light emission controller 3 controls the light emitting source 2 such that the intensity of the light projected into the target space changes at a constant cycle.

Figure 2:
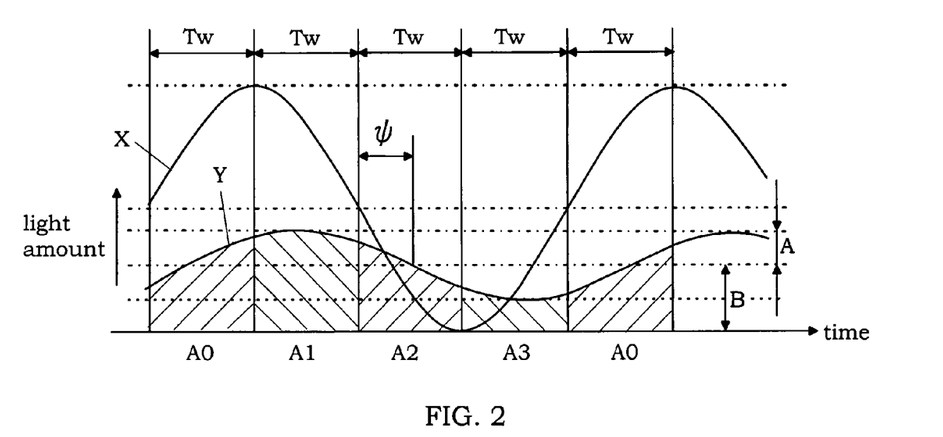
FIG. 2 is a diagram showing the operation principle of the detection device.

That is, as shown in FIG. 2, the intensity of the light emitted from the light emitting source 2 into the target space is modulated in a since waveform, as shown by the curve X. On the assumption that the received light amount of the photodetector 1 changes, as shown by the curve Y, the phase difference ψ corresponds to the time of flight. Therefore, by determining the phase difference ψ, the distance to the object Ob can be determined. That is, when the unit of the phase difference $\psi$ is (rad), the distance to the object Ob is L(m), the speed of light is c (m/s), and the angular frequency of the intensity-modulated light is ω (rad/s), the distance L is expressed by the following equation.

$$L = \psi \cdot c / 2\omega$$

The phase difference $\psi$ can be calculated by using the received light amounts of the curve Y obtained at plural timings in the curve X. For example, the received light amounts of the curve Y obtained at plural phase ranges in the curve X, i.e., 0 to 90 degrees, 90 to 180 degrees, 180 to 270 degrees, and 270 to 360 degrees are respectively defined as A0, A1, A2 and A3 (In FIG. 2, the received light amounts (A0, A1, A2, A3) are shown by hatching areas). Therefore, the received light amount (A0, A1, A2, A3) in each of the phase ranges is equivalent to an integrated value of the period Tw provided at every 90 degrees. Here, it is assumed that the phase difference $\psi$ (i.e., the distance to the object Ob) and the reflectance of the object Ob do not change during the process of obtaining the received light amounts (A0, A1, A2, A3). In addition, the intensity of the light emitted from the light emitting source 2 is modulated by sine wave, and the intensity of the light received at a time t by the photodetector 1 is expressed by A·sin(ωt+δ)+B, wherein A is an amplitude, B is a direct-current component (average value of environmental light component and reflected-light component), ω is an angular frequency of the intensity-modulated light (ω=2πf; f is a modulation frequency), and δ is an initial phase. From these conditions, the phase difference $\psi$ can be expressed by the following equation:

$$\psi = \tan^{-1}(A2 - A0)/(A1 - A3).$$

In this equation, depending on integration range (for example, a phase width of one zone in the above case is 90 degrees, but it may be 180 degrees), the sign may change, or the phase may be different by 90 degrees. Anyway, the phase difference $\psi$ can be determined by use of the received light amounts (A0, A1, A2, A3) of the above-mentioned four zones.

Since it is needed to modulate the intensity of the light projected into the target space with a modulation signal having a relatively high modulation frequency, a light source having high-speed response characteristic is used as the light emitting source 2. For example, a large number of light emitting diodes arranged on a single plane, or a combination of a semiconductor laser and a divergent lens can be used as the light emitting source 2. The modulation signal for driving the light emitting source 2 is output from the light emission controller 3, and the intensity of the light emitted from the light emitting source 2 is modulated by the modulation signal. For example, the light emission controller 3 outputs a sine wave of 10 MHz as the modulation signal. Alternatively, the waveform of the modulation signal may be a triangular wave or a saw-tooth wave other than the sine wave.

The photodetector 1 has a plurality of photosensitive portions 11 arranged in an orderly fashion. In addition, a light receiving optical system 5 is disposed on an incident path of the light into the photosensitive portions 11. Therefore, the light provided from the target space is incident on the photosensitive portions 11 through the light receiving optical system 5, so that electric charges corresponding to the received light amount are generated. In addition, the photosensitive portions 11 are arranged on lattice points of a planar lattice. For example, the photosensitive portions 11 can be arranged in a matrix pattern such that each of the photosensitive portions 11 is equally spaced from adjacent ones with respect to the vertical direction (i.e., longitudinal direction) and the horizontal direction (i.e., lateral direction).

Each of the photosensitive portions 11 is associated with a line-of-sight direction of viewing the target space from the photodetector 1 by the light receiving optical system 5. That is, an incident range of the light to each of the photosensitive portions 11 through the light receiving optical system 5 can be regarded as a conical viewing field where a center of the light receiving optical system 5 is an apex, and a small apex angle is set with respect to each of the photosensitive portions 11. Therefore, when the light irradiated from the light emitting source 2 is reflected by the object Ob in the target space, and the reflected light is incident on the photosensitive portion 11, it is possible to find a direction where the object Ob exists with respect to a reference direction that is an optical axis of the light receiving optical system 5, according to the position of the photosensitive portion 11 receiving the reflected light.

The light receiving optical system 5 is usually disposed such that its optical axis is orthogonal to the plane, on which the photosensitive portions 11 are arranged. Therefore, when an orthogonal coordinate system is set such that the center of the light receiving optical system 5 is the origin, and three axis directions consist of the longitudinal and lateral directions on the plane, on which the photosensitive portions 11 are arranged, and the optical axis of the light receiving optical system 5, angles (so-called azimuthal angle and elevation angle) obtained by expressing the position of the object Ob in the target space with spherical coordinates correspond to each of the photosensitive portions 11. The light receiving optical system 5 may be disposed such that its optical axis is intersected by an angle other than 90 degrees with the plane, on which the photosensitive portions 11 are arranged.

In the present embodiment, as described above, to determine the distance to the object Ob, the received light amounts (A0, A1, A2, A3) of the four phase zones, which are synchronized with a change in intensity of the light projected from the light emitting source 2 into the target space, are used. Therefore, it is needed to control timings of obtaining the intended received light amounts (A0, A1, A2, A3). In addition, since amounts of electric charges generated by the photosensitive portion 11 in one cycle of the intensity change of the light projected from the light emitting source 2 into the target space are small, it is desired to accumulate the electric charges over plural cycles. In this embodiment, as shown in FIG. 1, a plurality of charge accumulating portions 13 are formed, each of which is configured to accumulate the electric charges generated by the photosensitive portion 11. In addition, a sensitivity control portion 12 is formed to control a timing of accumulating the electric charges generated by each of the photosensitive portions 11 in the corresponding charge accumulating portion 13.

The photodetector 1 used in the present embodiment is formed on a single semiconductor substrate by arranging a plurality of photosensitive portions 11 in a matrix pattern (e.g., 100×100). The photodetector 1 has a vertical transfer portion, which is a CCD formed along each of vertical rows of the photosensitive portions 11 to transfer the electric charges in the vertical direction, and a horizontal transfer portion, which is a CCD for receiving electric charges from one end of the vertical portion, and transferring the electric charges in the horizontal direction. A transfer gate is formed between the vertical transfer portion and the photosensitive portions 11.

This photodetector 1 has substantially a same configuration as an interline transfer (IT) type CCD image sensor. A charge take-out portion 14 shown in FIG. 1 has functions including the vertical transfer portion and the horizontal transfer portion. In addition, the charge accumulating portion 13 has a function of accumulating the electric charges over a period before transfer is started at the vertical transfer portion.

By the way, the sensitivity control portion 12 is controlled by the light emission controller 3 so as to be high sensitivity in the four phase zones corresponding to the received light amounts (A0, A1, A2, A3) described above, and the electric charges equivalent to the received light amounts (A0, A1, A2, A3) are accumulated in the charge accumulating portions 13. In this regard, due to the use of the similar configuration to the IT type CCD image sensor, the function of the sensitivity control portion 12 can be actualized by using at least one of a configuration of regulating the electric charge amount accumulated from the photosensitive portions 11 in the vertical transfer portion by controlling the transfer gate, and a configuration of regulating a discarding amount of electric charges by forming a discarding electrode capable of discarding electric charges at every photosensitive portion 11. That is, by controlling the transfer gate such that the electric charges are transferred from the photosensitive portions 11 to the vertical transfer portion in the phase zone corresponding to the desired received light amount (A0, A1, A2, A3), or controlling a voltage applied to the discarding electrode such that the electric charges are discarded in a phase zone other than the desired phase zone, it is possible to accumulate the electric charges in the vertical transfer portion in only the desired phase zone, and transfer the accumulated electric charges.

In the meanwhile, when the light projected from the light emitting source 2 into the target space is reflected by the object Ob, and the reflected light is incident on the photosensitive portion 11 of the photodetector 1, the intensity of the received light is relatively small. Therefore, even if the electric charges corresponding to the received light amount (A0, A1, A2, A3) of each of the zones described above are accumulated in the charge accumulating portion 13 in one modulation period of the intensity modulated light, sufficient differences between the received light amounts (A0, A1, A2, A3) are not obtained. As a result, the measurement accuracy of distance may deteriorate. Therefore, in fact, the electric charges generated in each of the zones are accumulated in the charge accumulating portion 13 over plural modulation periods (e.g., 30000 periods) of the intensity-modulated light, and then taken out from the photodetector 1 through the charge take-out portion 14. The timing where the electric charges are taken out through the charge take-out portion 14 is controlled by the light emission controller 3.

In the following explanation, a period of accumulating the electric charges in the charge accumulating portion 13 (i.e., a period where electric charges of an intended zone are generated by the photosensitive portion 11) is referred hereinafter as light receiving period, and a period where the electric charges accumulated in the charge accumulating portion 13 are taken out (ejected) from the charge take-out portion 14 is referred hereinafter as read-out period.

By the way, in the above configuration, when four photosensitive portions 11 located adjacent to each other are used as one set, the electric charges of the four zones described above can be accumulated in the charge accumulating portions 13 by use of these four photosensitive portions 11. That is, by controlling the sensitivity control portions 12 corresponding to the four photosensitive portions 11 in association with the four zones for the received light amounts (A0, A1, A2, A3), it is possible to accumulate the electric charges equivalent to the received light amounts (A0, A1, A2, A3) in the four charge accumulating portions 13. According to this operation, the received light amounts (A0, A1, A2, A3) of the four zones can be extracted by setting one light receiving period and one read-out period. Therefore, there is an advantage that the distance to the object Ob can be determined by use of the information obtained within a relatively short time. However, since the four photosensitive portions 11 are used for one direction of the target space, the resolving power reduces to a quarter, as compared with the case where the single photosensitive portion 11 is associated with one direction of the target space. In addition, since the four photosensitive portions 11 located at different positions are associated with the one direction of the target space, the possibility that each of the photosensitive portions 11 receives a reflected light from other than the object Ob becomes high. As a result, it may lead to mismeasurement of the distance.

On the other hand, when the single photosensitive portion 11 is associated with the one direction of the target space, the resolving power becomes higher. Therefore, under the condition that the object Ob remains stationary, it is possible to reduce the mismeasurement of the distance to the object Ob. However, since it becomes necessary to set four light receiving periods and four read-out periods, an error easily occurs in the distance measurement under the condition that the object Ob is relatively moving. Under these circumstances, the present embodiment uses two photosensitive portions 11 as one set, so that the electric charges equivalent to the four received light amounts (A0, A1, A2, A3) are extracted by setting two light receiving periods and two read-out periods. That is, the first one of the two light receiving periods is used to take out the electric charges equivalent to the received light amounts (A0, A2), and the second one of the two light receiving periods is used to take out the electric charges equivalent to the received light amounts (A1, A3).

A received light output of the photodetector 1 described above is sent to a distance calculation portion 4 as an evaluation portion. The distance calculation portion 4 receives the electric charges equivalent to the four received light amounts (A0, A1, A2, A3), determines the phase difference $\psi$ by substituting them in the above equation or a table corresponding to the equation, and then determines the distance to the object Ob from the phase difference $\psi$. Since the distance calculation portion 4 determines distances with respect to plural directions of the target space, it is possible to obtain three-dimensional information about the target space, and generate a distance image having pixel values, each of which is associated with a distance value. In the case of using the conversion table, it is also preferred to determine the distance instead of the phase difference $\psi$.

By the way, the above equation for determining the phase difference $\psi$ from the received light amounts (A0, A1, A2, A3) of the four phase zones is effected on the assumption that the average value B is constant in the time periods for obtaining the received light amounts (A0, A1, A2, A3) of the four phase zones, in other words, the environmental light component does not change within the time periods for obtaining the received light amounts (A0, A1, A2, A3) of the four phase zones. Therefore, under the condition that the environmental light component fluctuates in each of the phase zones, the phase difference $\psi$ can not be determined. The embodiments explained below make possible to determine the phase difference $\psi$ even when the environmental light component has a fluctuation component, which fluctuates within each of the phase zones.

First Embodiment

In the present embodiment, as shown in FIG. 1, it is assumed that a plurality of distance measuring devices each having the above-mentioned configuration are disposed to have target spaces, which at least partially overlap each other. Each of the distance measuring devices is equipped with the light emitting source 2, the light emission controller 3, the photodetector 1 and the distance calculation portion 4. In addition, the light emission controller 3 of the present embodiment is configured such that a desired modulation frequency can be selected from plural kinds of modulation frequencies. In addition, a frequency selecting portion 6 is formed to select the modulation frequency for the light emission controller 3. As the frequency selecting portion 6, for example, it is possible to use a DIP switch or a rotary switch. Alternatively, another configuration may be used, in which a memory switch is used to select the frequency at the frequency selecting portion 6, and the contents of the memory switch can be changed by use of an aid device such as computers.

In the present embodiment, the modulation frequencies of the distance measuring devices are fixedly set to be different from each other. For example, when using three distance measuring devices, their modulation frequencies can be set to 10 MHz, 12 MHz and 15 MHz, respectively. In each of the distance measuring devices, received light outputs with amounts of electric charges, which correspond to the received light amounts (A0, A1, A2, A3) in specific phase zones synchronized with the modulation signal, are taken out from the photodetector 1, and then sent to the distance calculation portion 4. That is, the received light outputs with the amounts of electric charges corresponding to the received light amounts (A0, A2) are taken out in one read-out period of the photodetector 1, and the received light outputs with the amounts of electric charges corresponding to the received light amounts (A1, A3) are taken out in another one read-out period.

Figure 3:
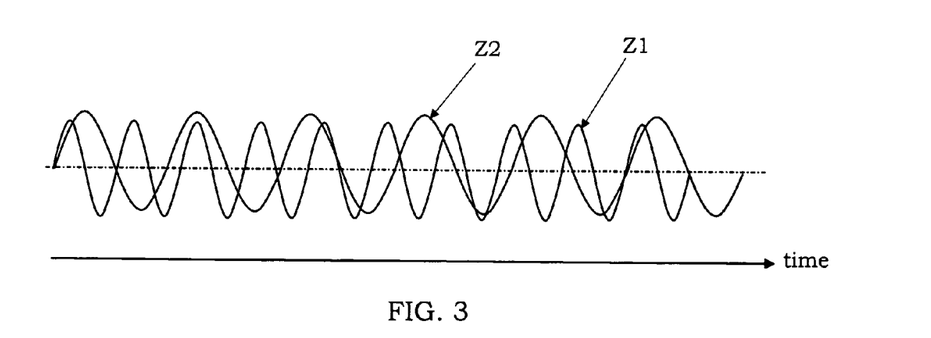
FIG. 3 shows a waveform profile in a case where different intensity modulated lights are overlapped with each other.

In each of the distance measuring devices, since the electric charges accumulated over a large number of periods of the modulation signal in the light receiving period are taken out, the received light outputs of the photodetector 1 contain a fluctuation component of the light having a different modulation frequency projected from the other distance measuring device into the target space. To simplify the explanation, when the two distance measuring devices having the different modulation frequencies of 10 MHz and 12 MHz have a common target space, these distance measuring devices receive both of the light Z1 of 12 MHz and the light Z2 of 10 MHz at the same time, as shown in FIG. 3. FIG. 3 shows that the received light intensities are substantially equal to each other. However, in fact, the received-light intensities are different from each other in many cases. When the lights having the two kinds of modulation frequencies are simultaneously received by the distance measuring device having the modulation frequency of 10 MHz, a component of each of the phase zones of the curve Z1 is added to the received light amount (A0, A1, A2, A3) of each the phase zones of the curve Z2. Here, when those lights are different from each other by about several times of the modulation period of the modulation signal, it is difficult to extract the received light amount (A0, A1, A2, A3) of each the phase zones of the curve Z2 from the total received light amount obtained in each of the phase zones.

The above-described problem is caused by the addition of the component of each of the phase zones of the curve Z1 to the received light amount (A0, A1, A2, A3) of each of the phase zones of the curve Z2. Therefore, when determining an integrated value over a long period such that components of plural phase zones covering the entire phase of the curve Z1 are evenly added to the received light amount (A0, A1, A2, A3) of each of the phase zones of the curve Z2, the component concerning the curve Z1 in the integrated value can be smoothed so as to be almost constant irrespective of phase zone of the curve Z2. As a result, it becomes possible to extract only the component concerning the curve Z2 from the integrated value. In the present embodiment, this smoothing treatment is performed at a smoothing unit 41 formed in the distance calculation portion 4 of the evaluation portion.

The distance calculation portion 4 determines the distance after the integration for smoothing is finished. In this regard, when the integrated value is determined with respect to each of the phase zones, the environmental light component and the reflected-light component are also integrated. As a result, the integrated value becomes large. For example, in the case of performing a digital signal treatment, a bit number corresponding to the integrated value increases, so that a high-capacity memory becomes necessary to store the integrated value. On the other hand, as described above, the differences (A0−A2), (A1−A3) of the received light amounts are used to calculate the distance. In each of these differences, since components with no fluctuation in the environmental light component are eliminated, it is possible to remarkably reduce the size of the integrated value by integrating the difference.

The present embodiment is achieved by use of the characteristics explained above. In the distance calculation portion 4 used as the evaluation portion, each of the integrated values of the differences (A0−A2), (A1−A3) of the received light amounts is determined over an integration time, which is prescribed by a frequency difference between the modulation frequencies of the respective detection devices, i.e., a period difference in the case where a fluctuation period of the environmental light component is known. The distance is determined by using the integrated values. It is desired that the integration time is set to one period (or an integral multiple of the period) of a beat component determined by the frequency difference between the modulation frequencies of the respective detection devices. That is, since the frequency difference between the component concerning the curve Z1 and the component concerning the curve Z2 is relatively small, the beat component corresponding to the frequency difference therebetween occurs. When determining the integrated value with the period of this beat component, it means removing the beat component. Therefore, when one period of the beat component determined by the frequency difference between the modulation frequencies is used as the integration time, the influences of the modulation frequencies can be cancelled each other to eliminate the environmental light component.

As described above, when the modulation frequencies of the three detection devices are set to 10 MHz, 12 MHz and 15 MHz, respectively, and the distance is determined by use of the detection device with 10 MHz, beat components having the frequency differences of 2 MHz and 5 MHz are generated. In this case, when the integration time is determined to be consistent with an integral multiple of the period of the each of the beat components, it is possible to eliminate the environmental light component. With respect to the above described frequencies, one periods of the beat components are $5 \times 10^{-7}$s and $2 \times 10^{-7}$s, respectively. A minimum time determined such that the integral multiple of the period of one of the beat components is consistent with the integral multiple of the period of the other beat component is 1 μs. Therefore, by using the integration time of 1 μs or an integral multiple thereof, one of the three detection devices can accurately determine the distance by canceling the influence of the lights projected from the other detection devices.

By the way, when the integration time is set sufficiently long, an error difference caused by vibration variations within the period of the beat component has only a small influence on the entire integrated values. Therefore, even when the above condition that the integration time is determined to be consistent with the integral multiple of the period of each of the beat components is not completely satisfied, it is possible to leave the occurrence of such an error out of consideration by setting the sufficiently long integration time. For example, when the integration time is equal to 30000 periods of the modulation signal, it has been confirmed that the integration time may not be determined so as to be consistent with the integral multiple of the period of each of the beat components.

In the present embodiment, the modulation frequencies of the detection devices having the common target space are previously known. Therefore, when each of the phase zones for obtaining the received light amounts (A0, A1, A2, A3) is set at an appropriate time interval according to the modulation frequency of each of the detection devices, the fluctuation component in the phase zone of the environmental light component can be canceled by simply determining the differences (A0−A2), (A1−A3) of the received light amounts.

By using the integrated values of the differences (A0−A2), (A1−A3) determined according to the above-described manner, it is possible to determine the phase difference $\psi$ between the light projected from the light emitting source 2 into the target space and a reflected-light component of the light received by each of the photosensitive portions 11 of the photodetector 1. In addition, when the unit of the phase difference $\psi$ is radian, the distance L to the object Ob can be expressed as L=Lm·$\psi$/2π. Here, when f is modulation frequency, and c is the speed of light (m/s), Lm=c/2f is effected. In brief, according to the principle described above, a travel distance of light that goes and returns within a time period equivalent to one period of the modulation signal corresponds to a measurable maximum distance Lm. In addition, since it is regarded that the maximum distance Lm is obtained when the phase difference $\psi$ is 2π, the distance L to the object Ob, on which the projected light is reflected in the target space, can be determined by calculating a ratio of the phase difference $\psi$ relative to 2π.

Thus, the distance L can be determined by use of the theoretical equation. However, in fact, an error occurs in the value of the theoretical equation due to the arrangement and the characteristics of each of constructional elements. In addition, the error generally changes with the distance. Therefore, it is needed to compensate the distance value determined by the theoretical equation. For example, a data table can be formed such that the distance value is associated with a compensated value. In the case of forming the data table, it is more efficient to carry out the calculation at the data table. In the present embodiment, a conversion table for determining a value corresponding to the distance from a combination of the differences (A0−A2), (A1−A3) is used as the data table. Here, as described above, since the distance L changes depending on the measurable maximum distance Lm, a different conversion table becomes necessary when the modulation frequency is switched by the frequency switching portion 6. Thus, a plurality of conversion tables can be formed for the selectable modulation frequencies. However, it takes a lot of trouble to register data in the conversion tables, and a high-capacity semiconductor memory becomes necessary to store the conversion tables.

In such a case, it is preferred to use a technique of forming a single kind of conversion table, which does not depend on the modulation frequency, determining an intermediate value corresponding to the phase difference from a combination of the differences (A0−A2), (A1−A3), and calculating the distance by compensating this intermediate value with a compensation value provided according to the modulation frequency. For example, when a value corresponding to (c·$\psi$/4π) is determined as the intermediate value, and a coefficient corresponding to (1/f) is used as the compensation value, the distance L to the object Ob can be determined by multiplying the intermediate value by the coefficient. In this case, the error resulting from the arrangement and characteristics of each constructional element is interfolded in the intermediate value. Alternatively, it is preferred to determine a value equivalent to the phase difference $\psi$ as the intermediate value, and use (c/4 π·f) as the compensation value. The intermediate value and the compensation value can be appropriately selected.

As described above, when the intermediate value is determined from the combination of the differences (A0−A2), (A1−A3), and then the compensation is made to the intermediate value according to the modulation frequency, it is enough to use only one kind of conversion table, which does not depend on the modulation frequency. As a result, it becomes easy to register the data in the conversion table, and a semiconductor memory with a reduced capacity becomes available to store the conversion table.

Second Embodiment

In the first embodiment, each of the modulation frequencies used in the plural detection devices is fixedly set by the frequency selecting portion 6. The present embodiment is characterized by automatically changing with time the modulation frequency of each of the detection devices. In other words, the present embodiment is different from the first embodiment in that a frequency switching portion (not shown) for automatically changing with time the modulation frequency is formed instead of the frequency selecting portion 6. Therefore, the other configurations and operations are similar to the first embodiment, and duplicate explanations are omitted.

As described above, the frequency switching portion is formed to automate the operation of selecting the modulation frequency in the frequency selecting portion 6. In addition, the selecting operation is interlocked with a timer function to automatically select the modulation frequency with time. Thus, since the modulation frequency is automatically changed with time, it becomes easy to set the modulation frequency. Here, it is desired that a time cycle of changing the modulation frequency is longer than the integration time explained in the first embodiment. The reason for this is that when the modulation frequency is changed during the integration time, the effect of substantially eliminating the influence of the light projected from the other detection device may not be achieved with reliability. In addition, it is preferred that each of the detection devices has variations in the timing of changing the modulation frequency. In this case, it is possible to lower the probability that the modulation frequency used in one of the detection devices having the common target space is consistent with that used in another one of the detection devices. Furthermore, when the modulation frequency is changed on an irregular base by the frequency switching portion, it is possible to further lower the probability that the same modulation frequency is used in the plural detection devices even in the case where the timing of changing the modulation frequency is not shifted.

Third Embodiment

As described in the basic configuration of the detection device, the photodetector 1 reads out the electric charges corresponding to the received light amounts (A0, A2) or (A1, A3) of the two phase zones in one read-out period. Therefore, two light receiving periods and two read-out periods are needed to read out the electric charges of the four phase zones. In other words, the distance measurement becomes possible by alternately repeating the light receiving period and the read-out period to complete two sets of the light receiving period and the read-out period. In addition, since it is not needed to project the light from the light emitting source 2 during the read-out period, it is also preferred that the read-out period is consistent with the rest period where the light is not projected from the light emitting source 2, and the light receiving period is consistent with the light projection period where the light is projected from the light emitting source 2 into the target space. In brief, it is desired that the light receiving period and the read-out period defined with respect to the operation of the photodetector 1 are respectively consistent with the light projection period and the rest period defined with respect to the operation of the light emitting source 2. The operation of the light emitting source 2 to determine the light projection period and the rest period is controlled by the light emission controller 3.

Figure 4:
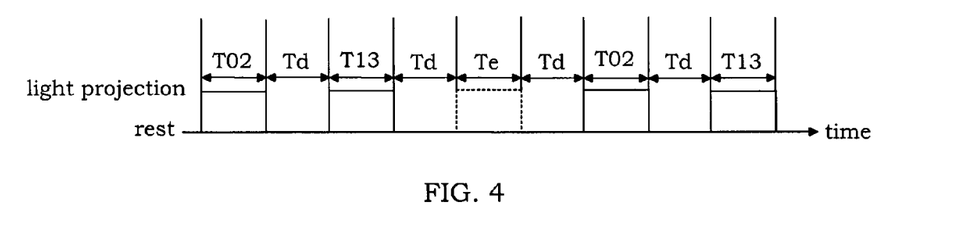
FIG. 4 is a diagram showing a light projection timing of the detection device.

For example, as shown in FIG. 4, the light receiving period T02 where the electric charges corresponding to the received light amounts (A0, A2) are generated is consistent with the light projection period of the light emitting source 2, and the light receiving period T13 where the electric charges corresponding to the received light amounts (A1, A3) are generated is consistent with the next light projection period of the light emitting source 2. In addition, the read-out period Td following each of the light receiving periods T02, T13 is consistent with the rest period of the light emitting source 2.

As described above, the light receiving period (T02, T13) and the read-out period Td are alternately repeated. On the other hand, in the present embodiment, a light receiving period Te which is not consistent with the light projection period is set at an appropriate timing, as shown in FIG. 4. That is, in the photodetector 1, the read-out period Td is also set to read out the electric charges generated in the light receiving period Te as well as the light receiving periods (T02, T13). The light receiving period Te is different from the light receiving periods (T02, T13) in that the light is not projected from the light emitting source 2 in the light receiving period Te. In brief, from the standpoint of the light emitting source 2, the period corresponding to the light receiving period Te as well as the period corresponding to the read-out period Td are consistent with the rest period.

In addition, since the light is not projected from the light emitting source 2 in the light receiving period Te, the photodetector 1 receives only the environmental light component in the light receiving period Te. In this case, under the condition that the intensity of the environmental light does not substantially fluctuate, a difference between the received light amounts of the two different phase zones in the rest period ideally becomes zero. On the other hand, even when the intensity of the environmental light substantially fluctuates, the fluctuation component can be smoothed and canceled by determining the integrated value over the integration time, as described above, from the standpoint of a long time scale. Therefore, according to comparison between the received light amounts of the two phase zones in the predetermined integration time, it becomes possible to make a decision as to whether the environmental light component has an influence on the distance measurement accuracy.

Figure 5:
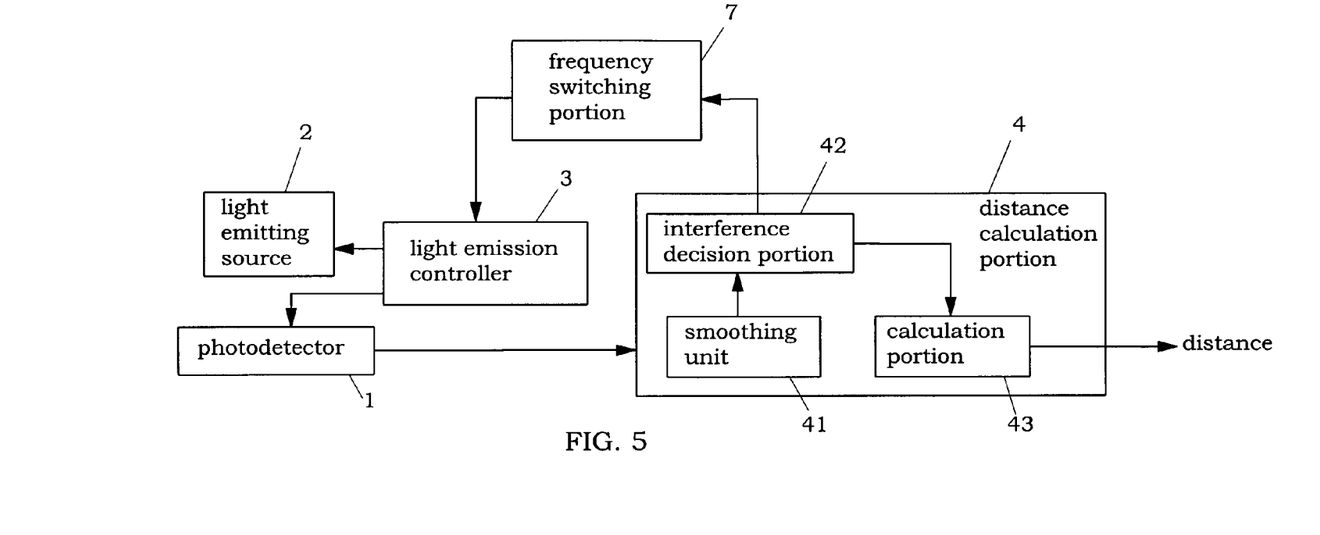
FIG. 5 is a schematic block diagram showing a characterizing portion of a spatial information detection device according to a third embodiment of the present invention.

From the above viewpoint, in the present embodiment, as shown in FIG. 5, an interference decision portion 42 is formed in the distance calculation portion 4 to make the aforementioned decision. The interference decision portion 42 determines a difference (A0–A2) between the integrated values (obtained over the integration time) of two phase zones different from each other by 180 degrees in the light receiving period Te for receiving only the environmental light component, and compares the difference with a predetermined threshold value to make the decision as to whether the environmental light component has the influence on the distance measurement accuracy. Only when the difference between the integrated values is not larger than the threshold value, the distance is determined by a calculation portion 43. According to these operations, it is possible to ensure the measurement accuracy.

On the other hand, when the difference between the integrate values is larger than the threshold value, it means that the environmental light component has the influence on the distance measurement accuracy. Therefore, the calculation of the distance is not performed in the calculation portion 43. In this case, it is preferred that the interference decision portion 42 automatically searches another modulation frequency with less influence of the environmental light component, or changes the modulation frequency until the difference becomes not larger than the threshold value, in other words, until the influence of the environmental light component falls within a permissible range. For example, in the present embodiment, a frequency switching portion 7 is formed to change the modulation frequency according to the decision result of the interference decision portion 42. The frequency switching portion 7 gives an instruction of changing the modulation frequency to the light emission controller 3 when the influence of the environmental light component is detected by the interference decision portion 42. Thus, since the frequency switching portion 7 automatically changes the modulation frequency to prevent the influence of the environmental light component, it is possible to reliably detect the spatial information, while saving time and effort to set the modulation frequency and maintaining the influence of the environmental light component within the permissible range. The other configurations and the operations are similar to the first embodiment.

In the above explanation, with respect to the light receiving period Te for receiving only the environmental light component, i.e., the received light amount obtained in the reset period, the influence of the environmental light component is determined by comparing the difference between the integrated values of the two phase zones different from each other by 180 degrees with the threshold value. The method of determining the influence of the environmental light is not limited to the case of using the received light amount obtained in the reset period. In addition, a subject to be compared with the threshold value is not limited to the difference between the integrated values. Moreover, the integrated values may be obtained at the two phase zones different from each other by an angle other than 180 degrees. In brief, the interference decision portion is essential to make the decision that the environmental light has an influence (interference) on the detection accuracy of the spatial information by using the fluctuation component of the environmental light smoothed by the smoothing unit with respect to the electric charges generated by receiving the light in at least one phase zone without distinction of the light projection period or the rest period. For example, when a value smoothed by the smoothing unit in a phase zone is compared with a predetermined threshold value, so that the smoothed value is larger than the threshold value, it is possible to make a decision that the fluctuation component of the environmental light is out of a predetermined permissible range, i.e., there is an interference of the environmental light. When the interference decision portion makes the decision that the fluctuation component of the environmental light is out of the permissible range, it is preferred to form the frequency switching portion for changing the modulation frequency of the modulation signal of the light emitting source until the fluctuation component of the environmental light falls within the permissible range, as described above.

Figure 6:
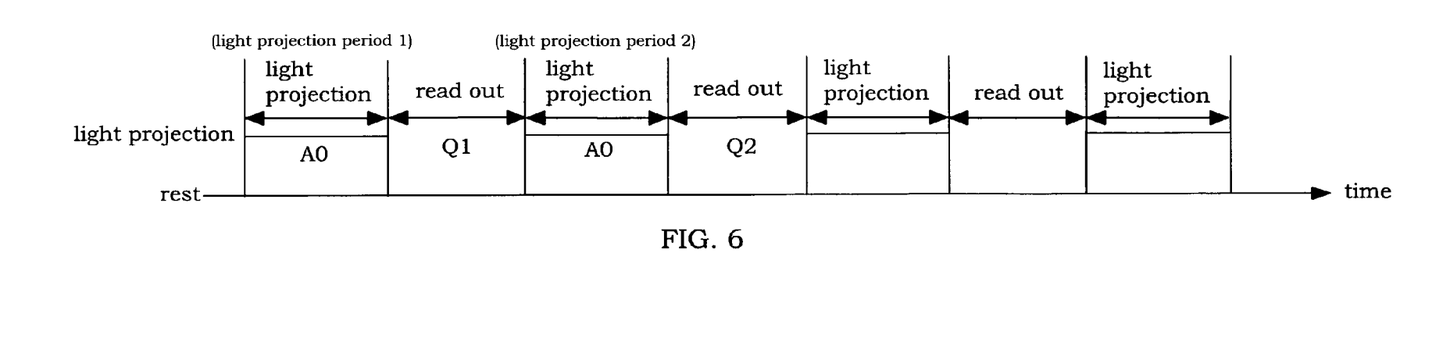
FIG. 6 is a diagram showing an interference decision method in the third embodiment.

The interference decision portion is explained below in more details. For example, with respect to the phase zone A0 (alternatively, it may be A1, A2 or A3) of FIG. 2, a total received light amount obtained in a light projection period 1 is Q1, as shown in FIG. 6. At this time, when there is an influence of the environmental light, the total received light amount contains a received light amount $\alpha$ corresponding to a smoothed fluctuation component of the environmental light obtained in the light projection period 1. Similarly, with respect to the phase zone A0 of FIG. 2, the total received light amount obtained in the next light projection period 2 is Q2. At this time, when there is the influence of the environmental light, the total received light amount contains a received light amount $\alpha'$ corresponding to a smoothed fluctuation component of the environmental light obtained in the light projection period 2. Here, when the fluctuation component of the environmental light is constant, a difference between the total received light amounts ideally becomes zero (Q1−Q2=0). However, when the fluctuation component of the environmental component is not constant ($\alpha \neq \alpha'$), the difference therebetween is not zero (Q1−Q2≠0). In this case, a predetermined threshold value $\beta$ is set. When an absolute value of this difference is larger than the threshold value $\beta$, it is decided that there is an influence (interference) of the environmental light. On the other hand, when the absolute value of the difference is not larger than the threshold value $\beta$, it can be decided that there is no influence of the environmental light.

In addition, the influence of environmental light can be decided according to a fluctuation of the calculated distance value. For example, a difference between a calculated distance value X1 obtained at the first time and a calculated distance value X2 obtained at the second time is determined. When an absolute value of this difference is larger than a predetermined threshold value $\gamma$, it is decided that there is an influence (interference) of the environmental light. On the other hand, when the absolute value of the difference is not larger than the threshold value $\gamma$, it can be decided that there is no influence of the environmental light. Furthermore, fluctuation of the difference (e.g., A0−A2) between two kinds of phase zones, or fluctuation of the sum of four phase zones (e.g., A0+A1+A2+A3) may be used for the interference decision.

In the above-mentioned embodiments, the same configuration as an interline (IT) type CCD image sensor is used. Alternatively, the same configuration as a frame transfer (FT) type CCD image sensor or a frame interline transfer (FIT) type CCD image sensor is also available. In addition, when using the IT type configuration for the transfer of electric charges, a configuration of discarding the electric charges as the sensitivity control portion 12, or a configuration of controlling the gate portion for transferring the electric charges from the photosensitive portion 11 to the charge take-out portion (the vertical transfer portion) is also available.

INDUSTRIAL APPLICABILITY

Thus, according to the present invention, even when a light having intensity fluctuations is irradiated from an illuminating lamp or the like into the target space at the same time as a light intensity-modulated at a predetermined modulation frequency is projected from the spatial information detection device of the present invention into the target space, or a light intensity-modulated at a different modulation frequency is also projected from another detection device into the same target space, it is possible to reduce or eliminate the influence of these environmental light components, and accurately detect the intended spatial information. Therefore, the present invention is expected to be utilized as the spatial information detection device with high reliability irrespective of the use environment in wide application fields such as security system and factory automation (FA).

The invention claimed is:

1. A spatial information detection device comprising:

a light emitting source configured to project a light intensity-modulated with a modulation signal having a predetermined modulation frequency into a target space;

a photodetector having a photosensitive portion configured to receive light from said target space, and generate electric charges corresponding to a received light amount;

an evaluation portion configured to detect spatial information of said target space by use of electric charges generated during a period synchronized with a prescribed phase zone of said modulation signal in the electric charges generated by said photosensitive portion; and smoothing means configured to, when an environmental light having intensity fluctuations exists in said target space, integrate, over a predetermined integration period, a fluctuation component in the prescribed phase zone of said modulation signal with respect amounts of electric charges generated at said photosensitive portion by receiving the environmental light, thereby smoothing said fluctuation component.

2. The spatial information detection device as set forth in claim 1, wherein said smoothing means is configured to integrate, over the predetermined integration period, said fluctuation component of the environmental light with respect to each of two prescribed phase zones of said modulation signal of said light emitting source, thereby smoothing said fluctuation component, and said evaluation portion is configured to determine a difference in amount of electric charge between the two prescribed phase zones with respect to the amounts of electric charges generated by receiving the light from said target space with said photodetector, so that said fluctuation components of the environmental light in the two prescribed phase zones are cancelled each other, and detect the spatial information by use of said difference.

3. The spatial information detection device as set forth in claim 2, wherein said evaluation portion has a conversion table where an intermediate value corresponding to a phase difference between the light projected from said light emitting source into said target space and the light received by said photodetector is associated with said difference, and a distance to an object existing in said target space is determined by compensating the intermediate value obtained form said conversion table with a compensation value determined according to said modulation frequency of the light projected from said light emission source into said target space.

4. The spatial information detection device as set forth in claim 1, wherein the environmental light has a known frequency different from said modulation frequency of said light emitting source, and said smoothing means is configured to integrate said fluctuation component over the integration period, which is determined according to a frequency difference between said modulation frequency of said light emitting source and the frequency of the environmental light.

5. The spatial information detection device as set forth in claim 4, wherein the environmental light has a known single frequency, and the integration period is equal to an integral multiple of a period of a beat component determined by the frequency difference between said modulation frequency of said light emitting source and the frequency of the environmental light.

6. The spatial information detection device as set forth in claim 4, wherein the environmental light has a plurality of known frequencies, and the integration period is equal to an integral multiple of a period of each of beat components, which is determined by the frequency difference between said modulation frequency of said light emitting source and each of the frequencies of the environmental light.

7. The spatial information detection device as set forth in claim 1, further comprising a frequency selecting portion configured to select said modulation frequency of said light emitting source from a plurality of previously set modulation frequencies.

8. The spatial information detection device as set forth in claim 1, further comprising a frequency switching portion configured to change said modulation frequency of said light emitting source with time.

9. The spatial information detection device as set forth in claim 8, wherein said frequency switching portion is configured to change said modulation signal on an irregular base.

10. The spatial information detection device as set forth in claim 1, further comprising an interference decision portion configured to make a decision as to whether the environmental light has an influence on detection accuracy of the spatial information by use of said fluctuation component of the environmental light smoothed by said smoothing means.

11. The spatial information detection device as set forth in claim 10, further comprising a frequency switching portion configured to, when said interference decision portion makes the decision that the environmental light has the influence on detection accuracy of the spatial information, change said modulation frequency of said light emitting source until the influence of the environmental light falls within a permissible range.

12. The spatial information detection device as set forth in claim 1, further comprising a light emission controller configured to control said light emitting source to have a light projection period where the light is projected from said light emitting source into said target space and a rest period where the light is not projected from said light emitting source into said target space.

13. The spatial information detection device as set forth in claim 12, wherein said smoothing means is configured to integrate, over the predetermined integration period, fluctuation components in two prescribed phase zones of said modulation signal with respect to electric charges generated at said photosensitive portion by receiving the environmental light in said rest period, thereby smoothing said fluctuation components.

14. The spatial information detection device as set forth in claim 13, further comprising an interference decision portion configured to compare a difference between said fluctuation components smoothed with respect to the electric charges generated by receiving the environmental light in said rest period with a threshold value, and make a decision that said fluctuation components of the environmental light exceed a predetermined permissible range when said difference is larger than the threshold value.

15. The spatial information detection device as set forth in claim 14, further comprising a frequency switching portion configured to, when said interference decision portion makes the decision that said fluctuation components of the environmental light exceed the permissible range, change said modulation frequency of said light emitting source until said difference becomes smaller than the threshold value.

16. The spatial information detection device as set forth in claim 12, wherein the environmental light has a known frequency different from said modulation frequency of said light emitting source, said smoothing means is configured to determine, over the integration period determined by a frequency difference between said modulation frequency of said light emitting source and the frequency of the environmental light, integrate values of fluctuation components in two prescribed phase zones of said modulation signal with respect to amounts of electric charges generated at said photodetector by receiving the light in said rest period, and said evaluation portion is configured to, when a difference between said integrated values is not greater than a threshold value, detect the spatial information by using the amounts of electric charges obtained over the integration period in said light projection period.

17. A spatial information detection system comprising:

a first detection device comprising a light emitting source configured to project a light intensity-modulated with a first modulation signal into a target space; a photodetector having a photosensitive portion configured to receive light from said target space and generate electric charges corresponding to a received light amount; and an evaluation portion configured to detect spatial information of said target space by use of electric charges generated during a period synchronized with a prescribed phase zone of said first modulation signal in the electric charges generated by said photosensitive portion; and a second detection device comprising a light emitting source configured to project a light intensity-modulated with a second modulation signal different from said first modulation signal into said target space; a photodetector having a photosensitive portion configured to receive light from said target space and generate electric charges corresponding to a received light amount; and an evaluation portion configured to detect spatial information of said target space by use of electric charges generated during a period synchronized with a prescribed phase zone of said second modulation signal in the electric charges generated by said photosensitive portion;

wherein said first detection device comprises smoothing means configured to, when the light intensity-modulated with said first modulation signal and the light intensity-modulated with said second modulation signal simultaneously exist in said target space, integrate, over a predetermined integration period, a fluctuation component in the prescribed phase zone of said first modulation signal with respect to amounts of electric charges generated by receiving the light intensity-modulated with said second modulation signal in amounts of electric charges generated at said photosensitive portion of said first detection device by receiving the light from said target space, thereby smoothing said fluctuation component.

* * * * *